S. T. MOFFETT.
Machine for Spirally Sawing Logs.
No. 203,182. Patented April 30, 1878.
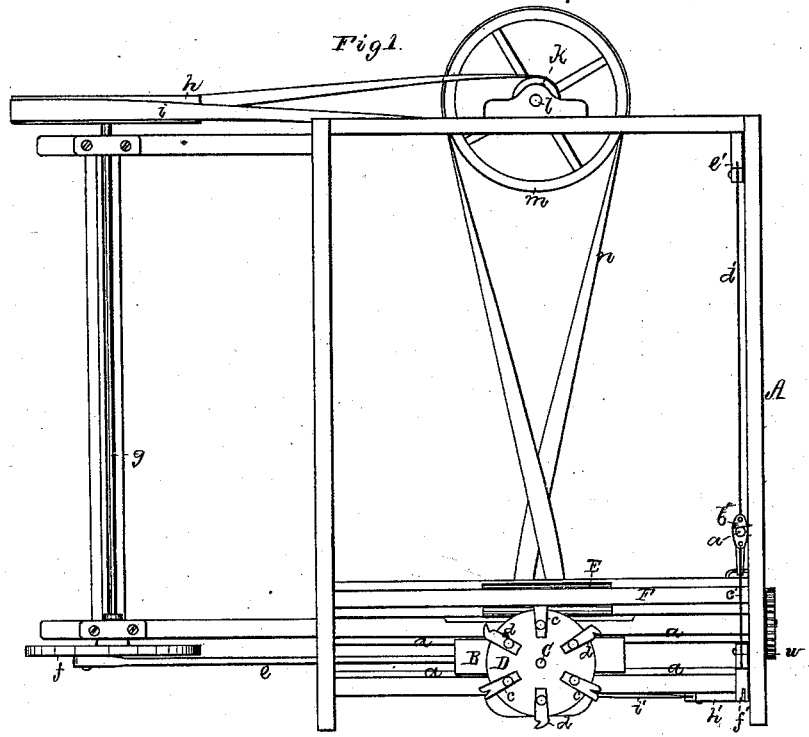
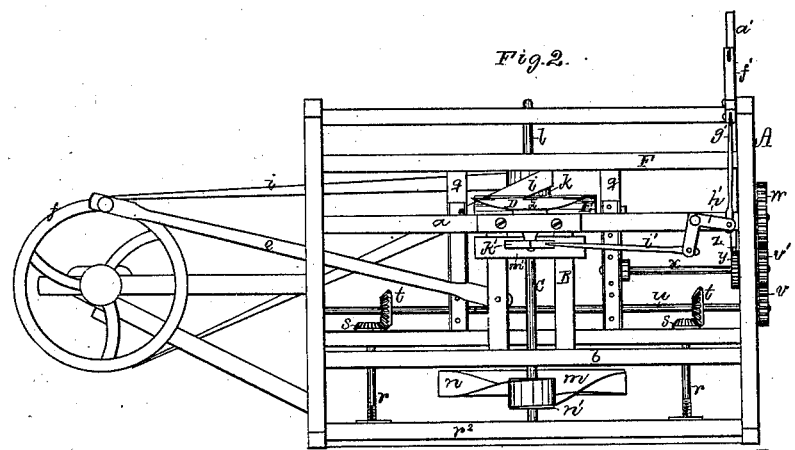

2 Sheets—Sheet 2.
S. T. MOFFETT.
Machine for Spirally Sawing Logs.
No. 203,182. Patented April 30, 1878.
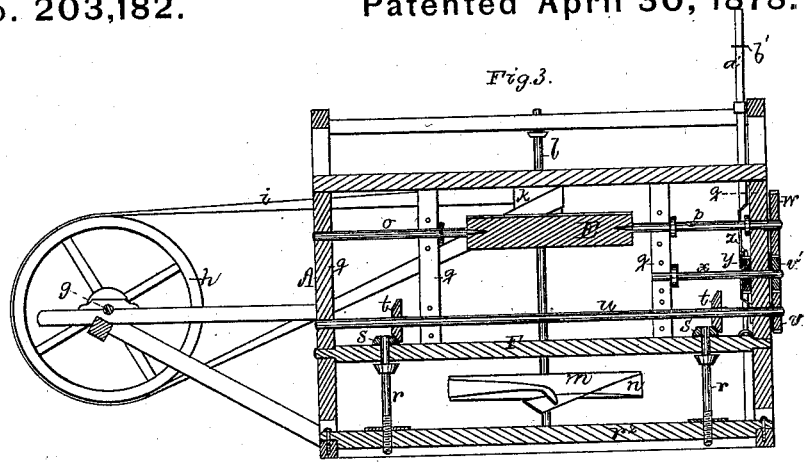
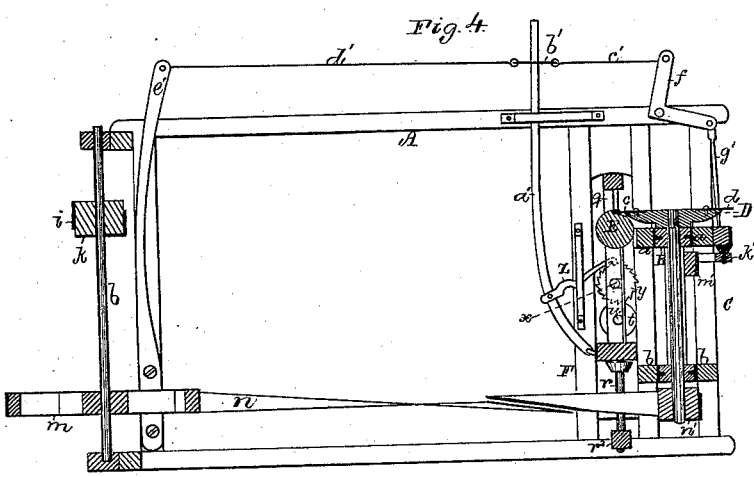
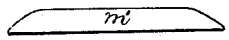
Witnesses.
S. N. Piper.
L. R. Miller
Inventor
Sewall T. Moffett
by his attorney
R. H. Eddy

UNITED STATES PATENT OFFICE.

SEWALL T. MOFFETT, OF LISBON, NEW HAMPSHIRE.

IMPROVEMENT IN MACHINES FOR SPIRALLY SAWING LOGS.

Specification forming part of Letters Patent No. 203,182, dated April 30, 1878; application filed April 4, 1878.

*To all whom it may concern:*

Be it known that I, SEWALL T. MOFFETT, of Lisbon, of the county of Grafton, of the State of New Hampshire, have invented a new and useful or Improved Machine for Spirally Sawing Logs; and do hereby declare the same to be described in the following specification and represented in the accompanying drawings, of which—

Figure 1 is a top view, Fig. 2 a front elevation, Fig. 3 a longitudinal section, and Fig. 4 a transverse section.

In this machine the log to be cut is supported by mechanism, by which it is intermittingly raised and revolved, in order that the rotary cutter-wheel or saw may intermittingly saw through it, the log being at rest while being sawed.

In the drawings, the frame of the machine is shown at A. It is provided with two sets, $a\ a\ b\ b$, of parallel rails or ways for supporting and guiding the saw-carriage. (Shown at B.) Arranged vertically in such carriage is a shaft, C, for supporting on its upper end the circular saw D, provided with a series of cutting-teeth, $c\ c$, and hooked or clearing teeth $d\ d$, arranged as shown. This saw-carriage has mechanism for imparting to it reciprocating rectilinear movements, such machinery consisting of a connecting-rod, $e$, and a cranked wheel, $f$, the latter being applied to a driving-shaft, $g$, arranged as represented. A pulley, $h$, fixed on such shaft, carries an endless belt, $i$, that extends partly about a small pulley, $k$, fixed on a vertical shaft, $l$, carrying a larger pulley, $m$, and being arranged in the frame in manner as shown.

An endless belt, $n$, goes about the wheel or pulley $m$ and a pulley, $n'$, fixed on the lower part of the saw-shaft, which derives its rotary motion from such pulleys $h\ k\ m\ n'$ and belts $i$ and $n$.

The log shown at E is sustained by and between two arbors, $o\ p$, arranged, as shown, in another carriage, F, placed in pairs of vertical guide-posts, $q\ q\ q\ q$. This carriage is supported by two rotary screws, $r\ r$, that screw into a stationary bar, $r^2$, arranged across the frame, as shown. On the tops of these screws bevel-gears $s\ s$ are fixed, they being to engage with other bevel-gears, $t\ t$, secured on a horizontal shaft, $u$, arranged in the carriage F, in manner as represented. A spur-gear, $v$, fixed on the outer end of the shaft $u$, engages with another spur-gear, $w$, by means of an intermediate gear, $v'$, the said gear $w$ being fixed on the arbor $p$. On the arbor $x$ of the said intermediate gear is a ratchet-wheel, $y$, that has resting on it a draw-pawl, $z$, pivoted to a long lever, $a'$, that extends up through a link, $b'$, connected by rods $c'\ d'$ with a spring, $e'$, and a right-angular lever, $f'$, all being arranged as represented.

By a rod, $g'$, the lever $f'$ is connected with another such lever, $h'$, which, in turn, by a rod, $i'$, is connected with a third such lever, $k'$, arranged horizontally, and pivoted to the frame at about the middle of its front end.

A cam, $m'$, formed as shown in top view in Fig. 5, and fixed to the saw-carriage, is to act against the lever $k'$, which it does during an advance as well as during a retreat of the carriage. In moving against the lever the cam will turn such lever on its fulcrum, and thereby the draw-pawl will be advanced in the ratchet-wheel. On the saw having passed through the log, the lever will have passed off the cam, and the draw-pawl will be retracted by the force of the spring $e'$. On the draw-pawl being drawn back, it will turn the ratchet, in consequence of which the screws $r\ r$ will be revolved so as to cause the log-carriage to be moved upward a short distance, it being at rest while the saw may be in movement through the log.

From the above it will be seen that after the saw may have passed through the log the latter will be forced upward a short distance, and at the same time revolved sufficiently for the saw to cut into it during the next movement of such saw. Thus the log, by the successive movements of the saw through it, and by being intermittingly raised and revolved, will be cut in a spiral from its circumference to or about to its center, and thereby will be reduced to a long board, which may be used for various purposes in the arts.

I claim—

1. The saw and log carriages arranged in and applied to the frame as described, and provided with mechanism, substantially as set forth, for revolving and otherwise moving the saw and elevating and turning the log, all as explained.

2. The combination for intermittingly elevating the log-carriage and revolving the log, such consisting of the screws $r\ r$, bevel-gears $s\ s\ t\ t$, shaft $u$, spur-gears $v\ v'\ w$, log-arbors $o\ p$, ratchet-wheel $y$, draw-pawl $z$, lever $a'$, spring $e'$, series of bent levers $f'\ h'\ k'$, and the cam $m'$, all being applied and arranged with the frame and the saw and log-carriages, substantially in manner and to operate as set forth.

SEWALL T. MOFFETT.

Witnesses:
R. H. EDDY,
JOHN R. SNOW.